(12) United States Patent
Gurvich et al.

(10) Patent No.: US 11,814,177 B2
(45) Date of Patent: Nov. 14, 2023

(54) SEAT WITH ENHANCED RESPONSE

(71) Applicant: B/E Aerospace, Inc., Winston-Salem, NC (US)

(72) Inventors: Mark R. Gurvich, Middletown, CT (US); Moises Perez, Miami, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 187 days.

(21) Appl. No.: 17/378,368

(22) Filed: Jul. 16, 2021

(65) Prior Publication Data

US 2023/0016843 A1    Jan. 19, 2023

(51) Int. Cl.
*B64D 11/06*    (2006.01)

(52) U.S. Cl.
CPC ........ *B64D 11/0619* (2014.12); *B64D 11/064* (2014.12)

(58) Field of Classification Search
CPC .................... B64D 11/0619; B64D 11/064
USPC .................................................. 297/216.17
See application file for complete search history.

(56) References Cited

U.S. PATENT DOCUMENTS

| | | | |
|---|---|---|---|
| 7,413,247 B2 * | 8/2008 | Van Druff | B60N 2/42736 297/216.17 |
| 8,439,420 B2 * | 5/2013 | Cantor | B60N 2/427 297/216.17 |
| 10,369,908 B2 | 8/2019 | Knox et al. | |
| 2006/0261647 A1 | 11/2006 | Maas et al. | |
| 2008/0015753 A1 | 1/2008 | Wereley et al. | |
| 2020/0238855 A1 | 7/2020 | Seib et al. | |

FOREIGN PATENT DOCUMENTS

| | | |
|---|---|---|
| AU | 2013220935 A1 | 8/2014 |
| DE | 102009017957 A1 | 1/2011 |
| EP | 0850156 B1 | 5/2002 |
| EP | 3003778 B1 | 5/2020 |
| GB | 2554869 B | 6/2020 |
| GB | 2581231 A | 8/2020 |
| WO | 2019212606 A1 | 11/2019 |
| WO | 2019222169 A1 | 11/2019 |

\* cited by examiner

*Primary Examiner* — Anthony D Barfield
(74) *Attorney, Agent, or Firm* — Suiter Swantz pc llo

(57) ABSTRACT

An active system and a computer-implemented method for reducing vibrations of seats in a vehicle is described. The system and method adjust a damping and/or a stiffness of a vibration damper based on system input signals from the vehicle or seat system. The signals include one or more of a signal associated with a user weight, a signal associated with time-dependent movement of a vehicle frame, and a signal associated with time-dependent movement of a seat back or a seat pan. The damping or the stiffness are adjusted by a closed loop control.

12 Claims, 5 Drawing Sheets

500

510
RECEIVE SIGNALS ASSOCIATED WITH A WEIGHT OF USER AND TIME-DEPENDENT VIBRATIONAL MOVEMENT

↓

520
ADJUST A STIFFNESS OR DAMPING OF AN ADAPTIVE VIBRATION DAMPER IN A CLOSED-LOOP CONTROL BASED ON THE SIGNALS

FIG. 5

SEAT WITH ENHANCED RESPONSE

TECHNICAL FIELD

The present disclosure generally relates to methods and systems for seat suspension devices and more particularly for adaptively controlled suspensions to reduce external vibrations from a rotorcraft through a seat and onto the seat's occupant.

BACKGROUND

Rotorcraft and, more generally, aircraft conditions may be associated with dynamic excitations during a) "normal" flight environments and b) emergency flight situations. In case of normal environments, such as those typically expected according to flight specifications, dynamic conditions may cause discomfort due to overall rotorcraft/aircraft vibration. In case of emergency situations, rapid dynamic impacts can be associated with injuries or even mortality. Therefore, it would be advantageous to provide a device, system, and method that cures the shortcomings described above.

SUMMARY

A system is disclosed, in accordance with one or more embodiments of the present disclosure. In one embodiment, the system includes a seat back. In another embodiment, the system includes a seat pan coupled to the seat back. In another embodiment, the system includes an adaptive vibration damper coupled between the seat back and a vehicle frame. In another embodiment, the adaptive vibration damper includes at least one of a damping element or a stiffness element. In another embodiment, the system includes a weight sensor configured to generate a signal associated with a weight of a user sitting on the seat pan. In another embodiment, the system includes a first movement sensor configured to generate a signal associated with time-dependent vibrational movement of at least one of the seat back or the seat pan In another embodiment, the system includes a second movement sensor configured to generate a signal associated with time-dependent vibrational movement of the vehicle frame. In another embodiment, the system includes a processor configured to execute program instruction maintained on a memory medium. In another embodiment, the program instructions cause the processor to receive the signals from the weight sensor, the first movement sensor, and the second movement sensor. In another embodiment, the program instructions cause the processor to adjust at least one of the stiffness element or the damping element of the adaptive vibration damper in a closed-loop control based on the signals received from the weight sensor, the first movement sensor, and the second movement sensor to control at least one of a frequency or an amplitude or damping parameters of the time-dependent vibrational movement of the seat back or the seat pan.

A computer-implemented method is disclosed, in accordance with one or more embodiments of the present disclosure. In one embodiment, the method includes receiving a signal associated with a weight of a user from a weight sensor, a signal associated with time-dependent vibrational movement of at least one of a seat back or a seat pan from a first movement sensor, and a signal associated with time-dependent vibrational movement of a vehicle frame from a second movement sensor. In another embodiment, the computer-implemented method includes adjusting at least one of a stiffness or a damping of an adaptive vibration damper coupled between the seat back and the vehicle frame in a closed-loop control based on the signals received from the weight sensor, the first movement sensor, and the second movement sensor to control at least one of a frequency or an amplitude or damping parameters of the time-dependent vibrational movement of the seat back or the seat pan.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings:

FIG. 5 depicts a flow-diagram of a method, in accordance with one or more embodiments of the present disclosure.

DETAILED DESCRIPTION OF THE INVENTION

Figure 1:
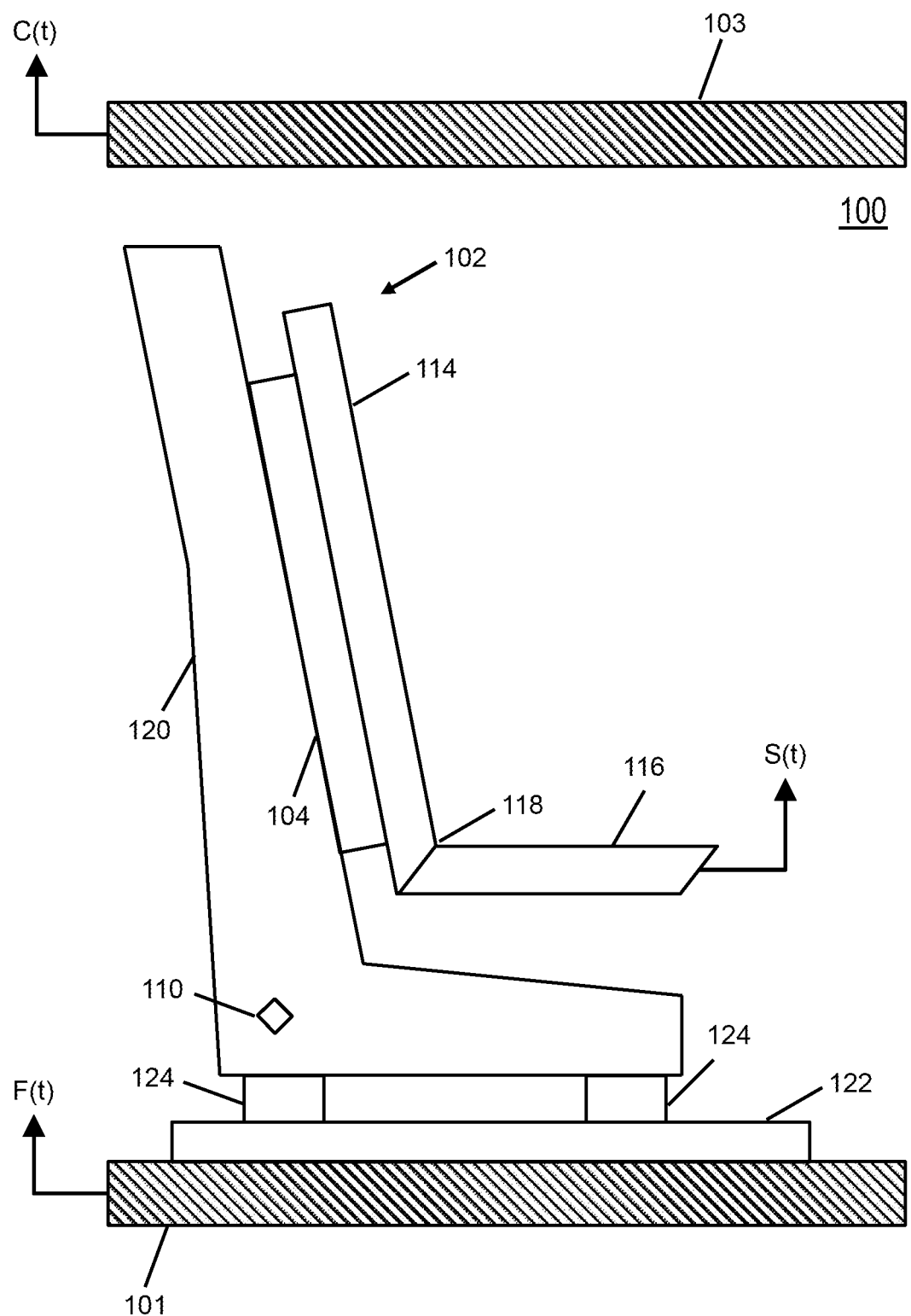
FIG. 1 depicts a schematic side view of a system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Broadly the present disclosure is directed to methods of controlling and designs of rotorcraft/aircraft seats with enhanced dynamic response. Various designs and methods are provided herein. The designs and methods are based on monitoring of movement of a seat and its support.

In example implementations, the concepts of the present disclosure may be incorporated in the seats of a rotorcraft. Using the concepts disclosed herein, rotorcraft passengers may experience more comfortable seating during normal operation environments together with a reduced likelihood of injury during a crash scenario. Although example embodiments of the present disclosure are shown and described in a rotorcraft environment, the inventive concepts of the present disclosure may be configured to operate in any type of chair and/or vehicle known in the art, such as, but not limited to, an aircraft. For example, the embodiments of the present disclosure may be incorporated into the driver/passenger chairs of any air, land, or water-based personal equipment or vehicle; any air, land, or water-based commercial equipment or vehicle; any air, land, or water-based military equipment or vehicle known in the art. In the interest of simplicity and to most clearly define the inventive concepts of the present disclosure, embodiments may be described throughout the present disclosure in an aircraft environment. However, these references are not to be regarded as limiting. Thus, references to "rotorcraft", "aircraft", or "aviation," and like terms should not be interpreted as a limitation on the present disclosure, unless noted otherwise herein.

A vehicle frame may experience dynamic conditions during flight. Such dynamic conditions may include a vibration. The vibration may include one or more of periodic sinusoidal (harmonic) or non-sinusoidal vibration or random vibration. Such vibration may occur in the vehicle frame when a mechanism of the associated vehicle is operating with a given frequency and/or for other reasons, such as, for example aerodynamic loads. In the rotorcraft context, vibrations in the vehicle frame may be generated based on the revolutions per minute of the rotor(s) (e.g., main rotors, tail rotors, ducted fans, etc.) together with the vibrational characteristics of the frame. Random vibrations may be generated based on one or more flight conditions of the vehicle or the surrounding airspace. Furthermore, dynamic conditions may include various other conditions, such as, but not limited to, impact loads associated with landing, bird strike conditions, foreign object impacts, and ballistic events, among others.

Crew and passengers may undergo dynamic conditions during the flight due to such vibrations. In this regard, the crew or passengers may be seated during flight such that the vibrations are translated into their bodies, including among others a seat bone or back. The vibrations felt by the crew and passengers due to the seat movement may be reduced or minimized by improving a dynamic load transfer between the vehicle frame and the seat. The dynamic load transfer may be reduced by a vibration damper.

The vibration damper may include a damping element and/or a stiffness element affecting the dynamic load transfer between the vehicle frame and the seat. The damping and/or stiffness elements may be adjustable for changing the dynamic load transfer. In this regard, the vibration damper may be considered an adaptive vibration damper. The adaptive vibration damper may be adjustable by a control block. The control block may receive one or more sensor readings. The sensor readings may include sensor readings from one or more weight sensors or movement sensors. The control block may adjust the stiffness and damping of the adaptive vibration damper based on the sensor readings. The adjustment may be performed continuously (e.g., over time) during the flight and respond to changing vibrational or impact conditions. Thus, a dynamic response of the seat may be made more comfortable or ergonomic for the crew and passengers.

Figure 2:
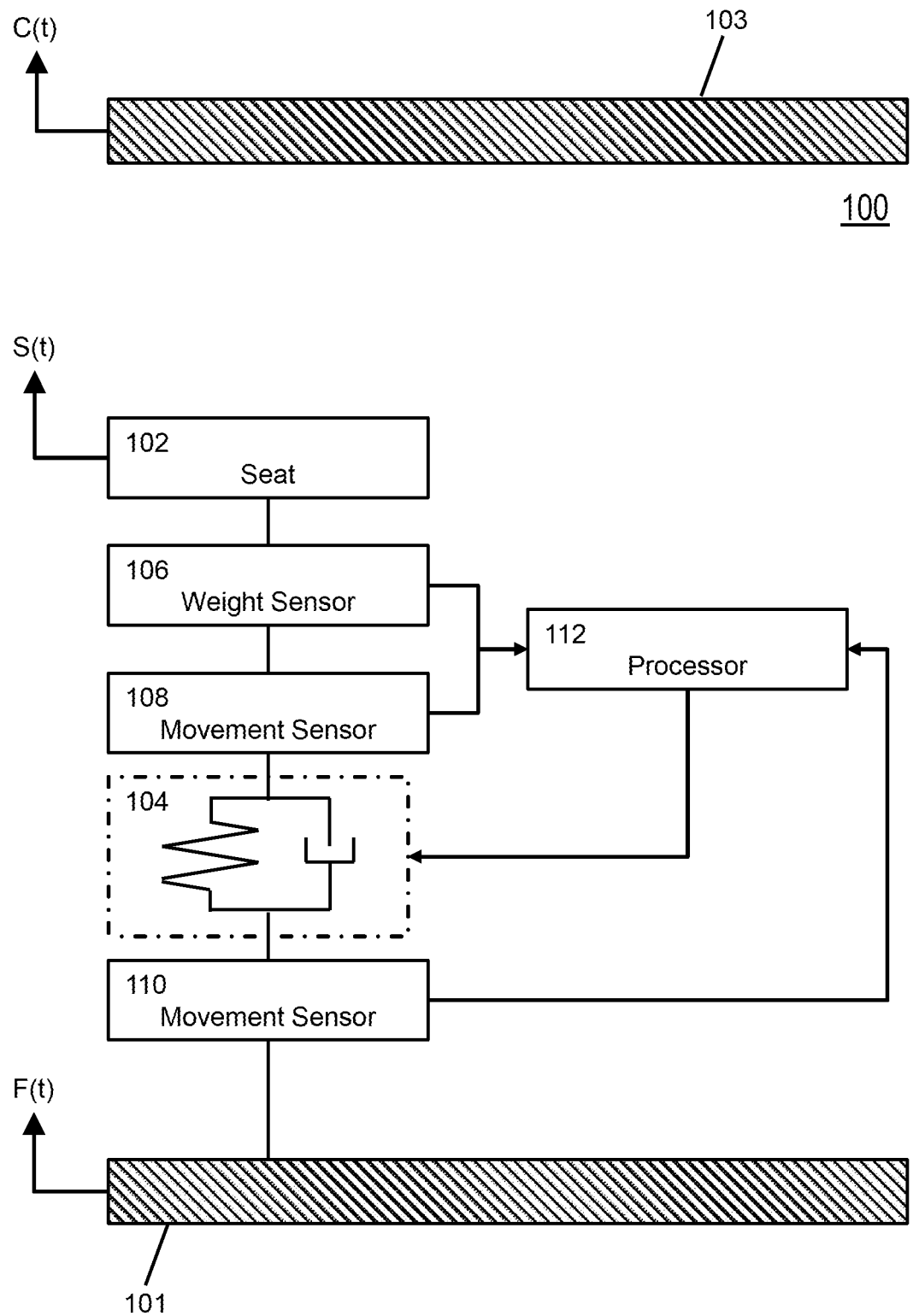
FIG. 2 depicts a block diagram of a system, in accordance with one or more embodiments of the present disclosure.

Referring now to FIGS. 1-2, a system 100 is described, in accordance with one or more embodiments of the present disclosure. The system 100 may undergo time-dependent movement. Such time-dependent movement may correspond, at least in part, to vibrations due to one or more rotors or to impact loading associated, for example, with landing. For example, a floor 101 of a vehicle frame may undergo time-dependent movement F(t). By way of another example, a ceiling 103 of the vehicle frame may undergo time-dependent movement C(t). By way of another example, a seat 102 of the system 100 may undergo time-dependent movement S(t). The time-dependent movement S(t) may be uncomfortable to the user of the seat 102.

The seat 102 may include one or more components, such as, but not limited to, a restraint system, a headrest, an armrest, a cushion, a seat frame, a stanchion, a tilt adjustment, a track adjustment, a height adjustment, a lumbar adjustment, or a swivel adjustment.

The seat 102 may include a seat back 114. The seat back 114 may include one or more contours for conforming to a body. The seat back 114 may be coupled with the seat pan 116. As may be understood, the seat back 114 and the seat pan 116 may be coupled in any suitable fashion. For example, the seat back 114 and the seat pan 116 may be formed as a fixed construction. By way of another example, the seat pan 116 may rotate, linearly translate, or otherwise move relative to the seat back 114. The seat pan 116 may move relative to the seat back 114 by any means, such as, but not limited to, one or more hinges 118.

The seat pan 116 may provide a surface on which a user may sit during flight, such that the users weight may be borne by the seat pan 116. The seat pan 116 may be oriented at a range of suitable angles relative to the floor 101. Such range of suitable angles may be based upon various ergonomic considerations. In some embodiments, the angle of the seat pan 116 may be adjustable by a tilt adjustment. The seat pan 116 may further include a range of distances from the floor 101. Such ranges may include any suitable range based on a height of a knee of the user from the floor 101. In some embodiments, the height of the seat pan 116 relative to the floor is adjustable by one or more height adjustment mechanisms. In some embodiments, the seat pan 116 includes one or more contours or cushion material for improving an ergonomic of a seat position of the user.

The seat 102 may also include a support structure 120. The support structure 120 may support the seat back 114. In this regard, the user weight on the seat back 114 and the seat pan 116 may be borne by the seat back 114 to the floor 101. Such support structure 120 may similarly transfer vibrational movements F(t) of the floor 101 to the seat back 114. In this regard, the vibrational movements S(t) of the seat 102 may be based on the vibrational movements F(t) of the floor 101.

The system 100 may include a track 122. The track 122 may be disposed along a length of the floor 101. The support structure 120 may be coupled between the track 122 and the vibration damper 104. The support structure 120 may be coupled with the track 122 by one or more seat attachments or joints 124. The joints 124 may be configured to allow the seat 102 translate along the track 122. Such track 122 may be advantageous for adjusting a position of the user's legs. Although the system 100 is depicted with the track 122, this is not intended as a limitation of the present disclosure. In this regard, the seat 102 may be fixed to the floor 101 (e.g., by the joints 124).

The seat 102 may also include a vibration damper 104. The vibration damper 104 may be coupled, directly or indirectly, between one or more seat components or the vehicle frame. The vibration damper 104 may be coupled between the seat back 114 and the floor 101. The vibration damper 104 may also be coupled between the seat back 114 and the support structure 120. The support structure may also be coupled between the vibration damper 104 and the floor 101. In this regard, vibrational movements F(t) of the floor may translate through the support structure 120 and the vibrational damper 104 before reaching the seat back 114.

The vibration damper 104 may include at least one stiffness element and/or at least one damping element. An amplitude or a frequency of the vibrational movements translating through the vibration damper 104 may be controlled by the stiffness and the damping elements. The stiffness element may control an amount of deformation which the vibration damper 104 undergoes in response to a force. In this regard, the stiffness element may impact the flexibility of the coupling between the seat back 114 and the support structure 120. The damping element may control an amount of oscillation by which the seat 102 may undergo due to the dynamic motion. In this regard, the energy transferred by the vibrational motion may be dissipated based on properties of the damping element. Such damping element may control a range of suitable situations, such as, but not limited to, undamped, underdamped, critically damped, or overdamped.

In some embodiments, the stiffness elements or the damping elements of the vibrational damper 104 are adjustable. By the adjustable stiffness or damping elements the vibration damper 104 may be considered an adaptive vibration damper. The vibrational damper 104 may include any suitable mechanism for adjusting the stiffness or the damping, such as, but not limited to, an electronically controlled spring, a piezoelectric actuator, or a magnetorheological damper. For example, electric power may be supplied to the electrically controlled spring to adjust a length of the spring. By way of another example, electric power may be supplied to the piezoelectric actuator to generate an internal strain. By way of another example, electric power may be supplied to the magnetorheological damper to induce a magnetic field within the magnetorheological damper to impact a viscosity of a magnetorheological fluid of the magnetorheological damper. As may be understood, the system 100 may be configured to receive electrical power from any suitable source, such as, but not limited to a battery or an on-board power source of the vehicle.

In some embodiments, the stiffness or the damping elements may be adjustable by one or more computer systems, such as a processor 112. The processor 112 may adjust the stiffness element or the damping element based on the user's weight and one or more measured movements. Thus, the stiffness element or the damping element may be adjusted to improve a dynamic response of the seat 102.

The system 100 may include one or more weight sensors 106. The weight sensor 106 may generate a signal associated with a weight of a user sitting on the seat pan 116. The weight sensor 106 may include any suitable sensor for measuring the weight of the seat user, such as, but not limited to, a strain gauge, a force-sensing capacitor, or a force-sensing resistor. The weight sensor 106 may be installed in any suitable position for measuring the weight of the user, such as, but not limited to, on or under the seat pan 116. In some embodiments, properties of the vibration damper 104 may be tuned based on an actual or measured mass or weight of the person in the seat 102. Based on the measurement, the properties may be automatically adjusted. In other embodiments, weight sensors may be absent. In such cases, information regarding user weight may be entered discreetly (for example, at the beginning of a flight) or assumed according to certain averaging expectations or can be automatically taken into account in a control loop.

The system 100 may also include one or more sensors for monitoring various time-dependent movement. The movement sensors may include any suitable sensor for measuring the various time-dependent movements, such as, but not limited to, an accelerometer, displacement gauge, strain gauge, or vibration sensor. The signal associated with the time-dependent movements may include one or more of acceleration, displacement, or strain. The time-dependent movement may be in a measurement orientation. The measurement orientation may include one or more dimensions, such as, but not limited to, a vertical direction with respect to the frame, a lateral direction with respect to the frame, or a transverse direction with respect to the frame, or any of their combinations.

The movement sensors may be installed in any suitable position for monitoring time-dependent movements. For example, a movement sensor 108 may generate a signal associated with time-dependent movement S(t)) of the seat 102. The movement sensor 108 may be installed in one or more of the seat back 114 or the seat pan 116. By way of another example, a movement sensor 110 may generate a signal associated with time-dependent movement F(t) of the floor 101. The movement sensor 110 may be disposed in any suitable position for generating the signal associated with time-dependent movement F(t), such as, but not limited to, on the floor 101 or on the support structure 120 proximate to the floor 101. As depicted in FIG. 1, the movement sensor 110 may be coupled on the support structure 120 proximate to the joint track 122.

The system 100 may also include a network (see FIG. 2 for example). One or more of the weight sensor 106, the movement sensor 108, or the movement sensor 110 may be configured to send signals by the network. The network may include any wireline communication protocol (e.g., DSL-based interconnection, cable-based interconnection, T9-based interconnection, and the like) or wireless communication protocol (e.g., GSM, GPRS, CDMA, EV-DO, EDGE, WiMAX, 3G, 4G, 4G LTE, 5G, Wi-Fi protocols, RF, Bluetooth, and the like) known in the art or any wireline/wireless combination. The herein described system illustrates different components contained within, or connected with, other components by the network. For example, the weight sensor 106 may be optional and, in the absence of the weight sensor 106, information regarding the user weight may be for example, entered discretely (i.e., at the beginning of flight) or assumed according to available statistics or taken into account by a control loop.

The system 100 may also include the processor 112. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). The processor 112 may be configured to execute a set of program instruction maintained on a memory.

The memory may include any storage medium known in the art suitable for storing program instructions executable by the associated processor. For example, the memory may include a non-transitory memory medium. By way of another example, the memory may include, but is not limited to, a read-only memory (ROM), a random-access memory (RAM), a magnetic or optical memory device (e.g., disk), a solid-state drive and the like. It is further noted that memory medium may be housed in a common controller housing with the processor. In one embodiment, the memory may be located remotely with respect to the physical location of the one processor. By executing the program instructions, the processor 112 may execute any of the various process steps described throughout the present disclosure.

The processor 112 may receive one or more signals from the weight sensor 106, the movement sensor 108, or the movement sensor 110. For example, the processor 112 may receive the one or more signals by the network. The processor 112 may then adjust the stiffness element or the damping element of the vibration damper 104 based on the received signals. The processor 112 may adjust one or more of the stiffness elements or the damping elements in a closed-loop control. By adjusting the stiffness element or the damping element, a dynamic response of the seat 102 may be improved such that the user may experience reduced vibrations. Advantageously, the dynamic response of the seat 102 may include an improved ability to absorb energy. By absorbing the energy, a user of the seat may have an improved comfort, ergonomic and experience reduced human fatigue, thereby enhancing mission performance. Furthermore, a severity of injuries during an impact situation may also be reduced. Such vibrational control may provide additional advantages, for example, an improved body stability during a medical evacuation or transportation.

The processor 112 may determine the stiffness or damping properties of the vibration damper 104 in any suitable manner, such as, but not limited to, a numerical algorithm or an analytical closed-form solution. For example, the numerical approach may include solving an algorithm based on inputs from the sensors to generate output to control connections. By way of another example, the analytical closed-form solution may generate correlations between the input signals and the output. Furthermore, a known stiffness of the support structure 120 may be used by the processor 112 in applying a numerical method or analytical method when adjusting the vibration damper 104. An optimization control analysis may be based on the comfort during normal service or injuries due to impact loading. The normal service may be with respect to amplitudes or frequencies or damping parameters of the seat.

Thus, the system 100 may adjust the properties of the vibration damper 104 without receiving a signal from an engine control network indicative of the rotorcraft revolutions per minute (RPM) or the vibrational characteristics of the frame. Such adjustment may be advantageous where the system 100 is at a lower security protocol than the engine control network and/or where the system 100 is configured for multiple types of rotorcraft, which may include different vibrational characteristics.

It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to wirelessly interactable and/or wirelessly interacting components and/or logically interacting and/or logically interactable components.

Figure 3:
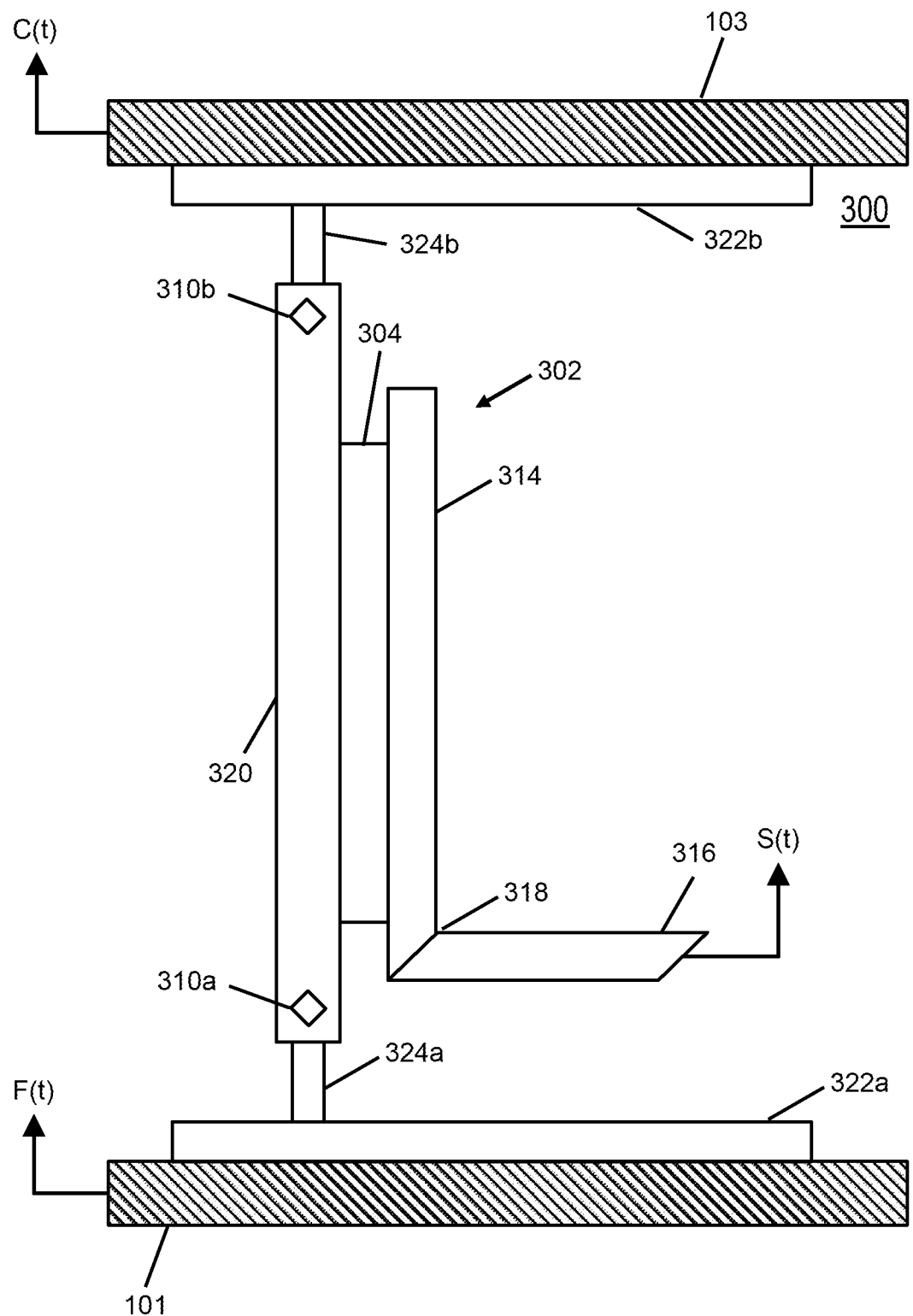
FIG. 3 depicts a schematic side view of a system, in accordance with one or more embodiments of the present disclosure.
Figure 4:
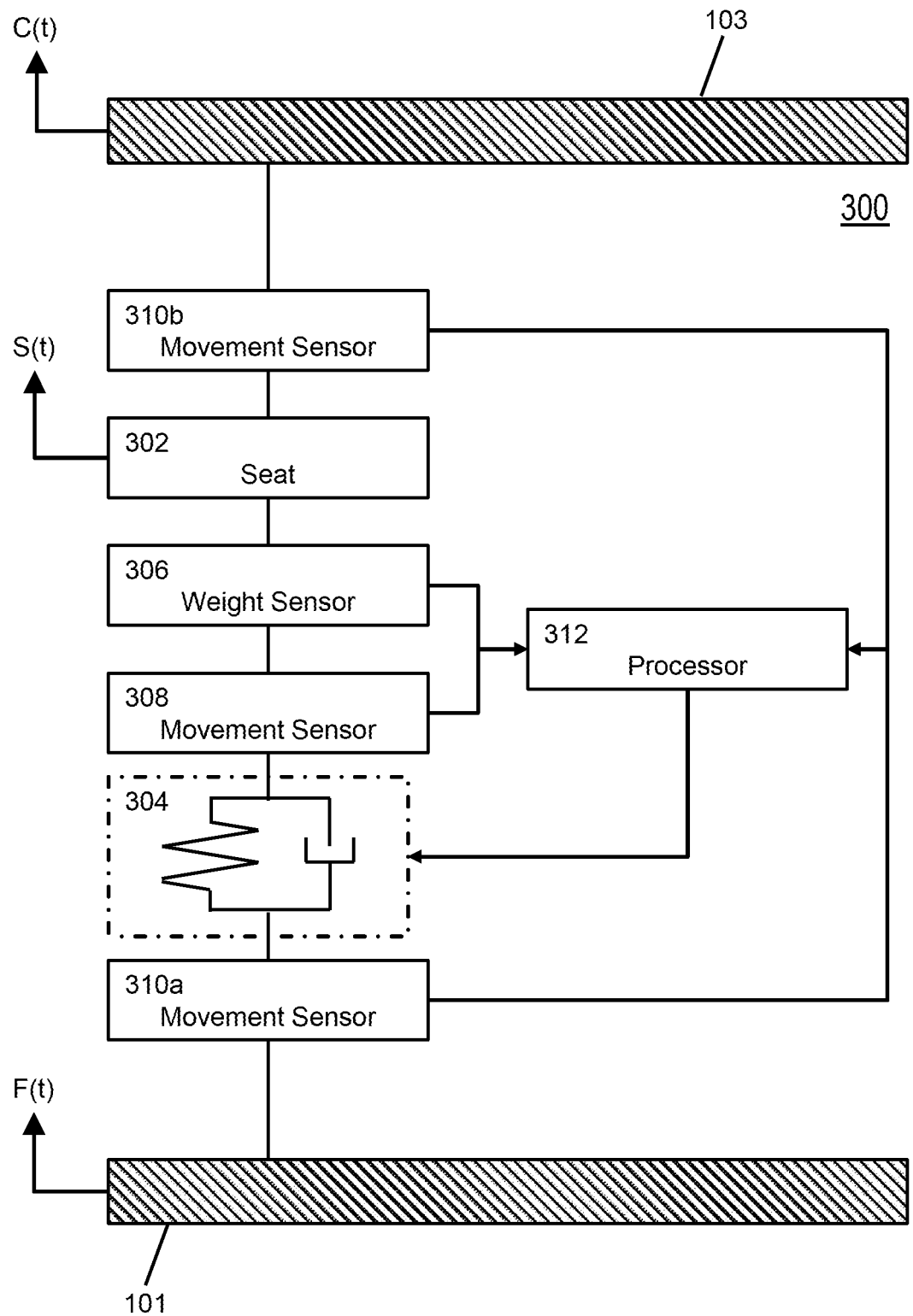
FIG. 4 depicts a block diagram of a system, in accordance with one or more embodiments of the present disclosure.

Referring now to FIGS. 3-4, a system 300 is described, in accordance with one or more embodiments of the present disclosure. The embodiments and the enabling technologies described previously herein in the context of the system 100 should be interpreted to extend to the system 300. It is further recognized, however, that the system 300 is not limited to the system 100.

The system 300 may be similar to the system 100. For example, the system 300 may include one or more of a seat 302, a vibration damper 304, a weight sensor 306, a movement sensor 308, a movement sensor 310a, a processor 312, a seat back 314, a seat pan 316, a hinge 318, a support structure 320, a track 322a, or a seat attachment joint 324a.

The system 300 may also include one or more additional connections with the frame. For example, the support structure 320 may be coupled between the floor 101 and the ceiling 103. The support structure 320 may further be coupled between the vibration damper 304 and both the floor 101 and the ceiling 103. The track 322a may be coupled between the support structure 320 and the floor 101. The support structure 320 may be coupled with the track 322a by one or more joints 324a. The track 322b may be coupled between the support structure 320 and the ceiling 103. Similarly, the support structure 320 may be coupled with the track 322a by one or more joints 324b.

The system 300 may also include a movement sensor 310b. The movement sensor 310b may generate a signal associated with time-dependent movement C(t) of the ceiling 103. The movement sensor 310b may be disposed in any suitable position for generating the signal associated with time-dependent movement C(t), such as, but not limited to, on the ceiling 103 or on the support structure 320 proximate to the ceiling 103. As depicted in FIG. 3, the movement sensor 310a may be coupled on the support structure 320 proximate to the track 322b.

The processor 312 may receive the signal from the weight sensors 306, the movement sensor 308, the movement sensor 310a, and the movement sensor 310b. The processor 312 may adjust at least one of the stiffness or the damping of the vibration damper 304 in the closed-loop control based on the signals from the weight sensor 306, the movement sensor 308, the movement sensor 310a, and the movement sensor 310b. Similarly to FIG. 1, the weight sensor 306 may be optional. Where the system 300 does not include a weight sensor 306 the user weight may be entered (or adjusted) discreetly (i.e., at the beginning of flight) or assumed based on available statistical information or taken into account through a control loop.

Referring now to FIG. 5, a method 500 is described, in accordance with one or more embodiments of the present disclosure. The embodiments and the enabling technologies described previously herein in the context of the system 100 and the system 300 should be interpreted to extend to the method 500. It is further recognized, however, that the method 200 is not limited to the system 100 or the system 300.

In a step 510, one or more signals are received. The signals may include a signal associated with a weight of a user. The signal associated with the weight of a user may be received from a weight sensor (e.g., weight sensor 106, weight sensor 306). The signals may also include a signal associated with time-dependent vibrational movement associated with at least one of a seat back or a seat pan. The time-dependent vibrational associated with at least one of the seat back or the seat pan may be received from a first movement sensor (e.g., movement sensor 108, movement sensor 308). The signals may also include a signal associated with time-dependent vibrational movement of a floor of a vehicle frame. The signal associated with the time-dependent vibrational movement of the floor may be received from a second movement sensor (e.g., movement sensor 110, movement sensor 310a). In some embodiments, the signals may also include a signal associated with time-dependent vibrational movement of a ceiling of the vehicle frame. The signals associated with the time-dependent vibrational movement of the ceiling may be received from a third movement sensor (e.g., movement sensor 310a).

The signals may be received by a processor (e.g., processor 112, processor 312) and stored in a memory. The signals may be received by the processor by way of a network.

In a step 520, a stiffness or a damping of an adaptive vibration damper is adjusted. The stiffness or a damping of an adaptive vibration damper is adjusted in a closed-loop control based on the signals received from the weight sensor, the first movement sensor, and the second movement sensor. The stiffness or the damping may be adjusted to control one or more of a frequency or an amplitude of the time-dependent vibrational movement of the seat back or the seat pan. The closed-loop control may include any suitable closed-loop control method. For example, the closed-loop control may include one or more numerical algorithms or an analytical closed-form method. In some embodiments, the closed-loop control is further based on the signal received from the third movement sensor.

The adaptive vibration damper is coupled between the seat back and the floor. For example, the adaptive vibration damper may be coupled between the seat back and the floor by one or more of a support structure, a joint, and a track. In some embodiments, the adaptive vibration damper is also coupled between the seat back and the ceiling. For example, the adaptive vibration damper may be coupled between the seat back and the ceiling by one or more of the support structure, a second joint, and a second track.

The method described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory. It is further contemplated that each of the embodiments of the method described above may include any other step(s) of any other method(s) described herein. In addition, each of the embodiments of the method described above may be performed by any of the systems described herein. It is to be noted that the specific order of steps in the foregoing disclosed methods are examples of exemplary approaches. Based upon design preferences, it is understood that the specific order of steps in the method can be rearranged while remaining within the scope of the present disclosure.

Referring generally again to FIGS. 1-5.

The various systems described herein may be implemented by for one or more of a pilot seating, a passenger seating, or in a group of seating (e.g., troop seating).

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting. Furthermore, the various geometries depicted in the accompanying figures are not intended to be limiting and that various modifications are contemplated.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   a seat comprising:
      a seat back;
      a seat pan coupled to the seat back;
      a support structure coupled between the seat back and a vehicle frame, the support structure configured to transfer a load from the vehicle frame to the seat back; and
      an adaptive vibration damper coupled between the seat back and the support structure, the adaptive vibration damper including at least one of a damping element or a stiffness element;
   a track coupled between the support structure and the vehicle frame for adjusting a position of the seat back relative to the vehicle frame; wherein the support structure is coupled between the track and the adaptive vibration damper; wherein the support structure is coupled with the track by one or more joints; wherein the one or more joints are configured to allow the seat to translate along the track;
   a first movement sensor configured to generate a signal associated with time-dependent vibrational movement of at least one of the seat back or the seat pan;
   a second movement sensor configured to generate a signal associated with time-dependent vibrational movement of the vehicle frame; wherein the second movement sensor is coupled to the support structure proximate to the track; and
   a processor configured to execute program instruction maintained on a memory medium causing the processor to:
      receive the signals from the first movement sensor and the second movement sensor;
      adjust at least one of the stiffness element or the damping element of the adaptive vibration damper in a closed-loop control based on the signals received from the first movement sensor and the second movement sensor to control at least one of a frequency or an amplitude of the time-dependent vibrational movement of at least one of the seat back or the seat pan.

2. The system of claim 1, wherein the closed-loop control comprises at least one of a numerical algorithm or an analytical closed-form method.

3. The system of claim 1, wherein the seat pan is at least one of formed as a fixed construction with the seat back or configured to at least one of rotate or linearly translate relative to the seat back.

4. The system of claim 1, wherein the adaptive vibration damper comprises at least one of an electrically controlled spring, a piezoelectric actuator, or a magnetorheological damper.

5. The system of claim 1, wherein at least one of the first movement sensor or the second movement sensor comprises at least one of an accelerometer, a displacement gauge, a strain gauge, or a vibration sensor; wherein the signal associated with the time-dependent vibrational movement of the vehicle frame comprises at least one of an acceleration, a displacement, or a strain.

6. The system of claim 1, wherein the processor is further configured to adjust at least one of the stiffness element or the damping element based on an impact loading associated with the vehicle frame.

7. The system of claim 1, further comprising a weight sensor configured to generate a signal associated with a weight of a user sitting on the seat pan; wherein the processor is further configured to receive the signal from the weight sensor; wherein the processor adjusts at least one of the stiffness element or the damping element of the adaptive vibration damper in the closed-loop control based on the signal received from the weight sensor.

8. A system comprising:
   a seat back;
   a seat pan coupled to the seat back;
   a support structure coupled between a ceiling and a floor of a vehicle frame, the support structure further coupled between the seat back and the vehicle frame, the support structure configured to transfer a load from the vehicle frame to the seat back;
   an adaptive vibration damper coupled between the seat back and the support structure, the adaptive vibration damper including at least one of a damping element or a stiffness element;
   a first track coupled between the support structure and the floor;
   a second track coupled between the support structure and the ceiling; wherein the first track and the second track provide for adjusting a position of the seat back relative to the vehicle frame;
   a first movement sensor configured to generate a signal associated with time-dependent vibrational movement of at least one of the seat back or the seat pan;
   a second movement sensor configured to generate a signal associated with time-dependent vibrational movement of the floor; wherein the second movement sensor is coupled to the support structure proximate to the first track;

a third movement sensor configured to generate a signal associated with time-dependent vibrational movement of the ceiling; wherein the third movement sensor is coupled to the support structure proximate to the second track; and a processor configured to execute program instruction maintained on a memory medium causing the processor to:

receive the signals from the first movement sensor, the second movement sensor, and the third movement sensor;

adjust at least one of the stiffness element or the damping element in a closed-loop control based on the signals received from the first movement sensor, the second movement sensor, and the third movement sensor to control at least one of a frequency or an amplitude of the time-dependent vibrational movement of at least one of the seat back or the seat pan.

9. The system of claim 8, wherein the closed-loop control comprises at least one of a numerical algorithm or an analytical closed-form method.

10. The system of claim 8, wherein the adaptive vibration damper comprises at least one of an electrically controlled spring, a piezoelectric actuator, or a magnetorheological damper.

11. The system of claim 8, wherein at least one of the first movement sensor, the second movement sensor, or the third movement sensor comprises at least one of an accelerometer, a displacement gauge, a strain gauge, or a vibration sensor.

12. The system of claim 8, further comprising a weight sensor configured to generate a signal associated with a weight of a user sitting on the seat pan; wherein the processor is further configured to receive the signal from the weight sensor; wherein the processor is configured to adjust at least one of the stiffness element or the damping element in the closed-loop control based on the signal received from the weight sensor.

* * * * *